(12) United States Patent
Maehata et al.

(10) Patent No.: US 9,121,477 B2
(45) Date of Patent: Sep. 1, 2015

(54) DRIVING DEVICE AND IMAGE FORMING APPARATUS INCLUDING THE DRIVING DEVICE

(71) Applicants: Yasuhiro Maehata, Tokyo (JP);
Yasuhisa Ehara, Kanagawa (JP);
Hiromichi Matsuda, Kanagawa (JP);
Katsuaki Miyawaki, Kanagawa (JP)

(72) Inventors: Yasuhiro Maehata, Tokyo (JP);
Yasuhisa Ehara, Kanagawa (JP);
Hiromichi Matsuda, Kanagawa (JP);
Katsuaki Miyawaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/973,068

(22) Filed: Aug. 22, 2013

(65) Prior Publication Data
US 2014/0073476 A1 Mar. 13, 2014

(30) Foreign Application Priority Data
Sep. 7, 2012 (JP) .................................. 2012-197194

(51) Int. Cl.
*F16H 1/28* (2006.01)
*G03G 15/00* (2006.01)

(52) U.S. Cl.
CPC . *F16H 1/28* (2013.01); *G03G 15/75* (2013.01)

(58) Field of Classification Search
None
See application file for complete search history.

(56) References Cited

U.S. PATENT DOCUMENTS

| 6,023,836 A * | 2/2000 | Matsuoka et al. ............... 29/557 |
| 2008/0145102 A1 | 6/2008 | Katoh et al. |
| 2009/0017953 A1* | 1/2009 | Uehara et al. .................. 475/149 |
| 2012/0046142 A1* | 2/2012 | Miyawaki et al. ............. 475/331 |

FOREIGN PATENT DOCUMENTS

JP     2008-151868     7/2008

* cited by examiner

*Primary Examiner* — Erin D Bishop
(74) *Attorney, Agent, or Firm* — Harness, Dickey & Pierce P.L.C.

(57) ABSTRACT

A driving device includes a drive source, a planetary gear decelerator, a drive-target shaft, a rotation speed detector, and a sensor mount. The planetary gear decelerator includes a planetary gear mechanism equipped with an output shaft, a sun gear, an outer gear, a plurality of planetary gears, and a rotatable first carrier. The outer gear is made of resin and includes a deformable portion at a drive target side, and the deformable portion is elastically deformable in a radial direction. The plurality of planetary gears engages the sun gear and the outer gear. The rotatable first carrier rotatably supports the planetary gears. The rotation speed detector detects a rotation speed of the planetary gear decelerator, and includes a sensor and a detection target disposed coaxially on the output shaft. The sensor mount supports the sensor and moves in the radial direction in accordance with elastic deformation of the outer gear.

14 Claims, 6 Drawing Sheets

FIG. 8 ion is elastically deformable in a radial direction. The plurality of planetary gears is disposed along an inner circumferential surface of the outer gear at equal intervals and engages the sun gear and the outer gear. The rotatable first carrier rotatably supports the plurality of planetary gears. The drive-target shaft is connected to the output shaft of the planetary gear mechanism, to support the drive target and transmit the torque to the drive target. The rotation speed detector detects a rotation speed of the planetary gear decelerator and includes a sensor and a detection target disposed coaxially on the output shaft. The sensor mount supports the sensor and moves in the radial direction in accordance with elastic deformation of the outer gear.

The aforementioned and other aspects, features and advantages would be more fully apparent from the following detailed description of illustrative embodiments, the accompanying drawings and the associated claims.

DRIVING DEVICE AND IMAGE FORMING APPARATUS INCLUDING THE DRIVING DEVICE

CROSS-REFERENCE TO RELATED APPLICATIONS

This patent application is based on and claims priority pursuant to 35 U.S.C. §119 to Japanese Patent Application No. 2012-197194, filed on Sep. 7, 2012, in the Japan Patent Office, the entire disclosure of which is hereby incorporated by reference herein.

BACKGROUND

1. Technical Field

Exemplary aspects of the present invention generally relate to a driving device and an image forming apparatus including the driving device, and more particularly to an image forming apparatus such as a copier, a facsimile machine, a printer, or a multi-functional system including a combination thereof.

2. Description of the Related Art

Known electrophotographic image forming apparatuses such as a printer and a copier form an electrostatic latent image on a surface of a rotating latent image bearing member (hereinafter referred to as photosensitive drum), and subsequently, the electrostatic latent image is developed with toner into a visible image, known as a toner image. The toner image thus obtained is primarily transferred onto an endless belt (hereinafter referred to as intermediate transfer belt). The toner image on the intermediate transfer belt is then secondarily transferred onto a recording medium. Lastly, the toner image on the recording medium is fixed under heat and pressure applied thereto.

In such image forming apparatuses, precise control of rotation speed of the photosensitive drum and the intermediate transfer belt is required. More specifically, the photosensitive drum and the intermediate transfer belt need to be rotated at a constant speed. If the speed of rotation of the photosensitive drum and the intermediate transfer belt fluctuates, imaging failure such as jitter and unevenness of image density occurs. Furthermore, if the rotation speed continues to fluctuate at a certain frequency, unevenness of image density appears periodically over the entire image as banding or stripes on an output image. The banding derived from such fluctuation of the rotation speed degrades imaging quality significantly.

In view of the above, various techniques have been proposed to accurately rotate the photosensitive drum and the intermediate transfer belt. For example, a gear assembly is employed to adjust the rotation speed of the target. However, known gear assemblies tend to be heavy and large, complicating efforts to make an image forming apparatus as a whole as compact as is usually desired.

SUMMARY

In view of the foregoing, in an aspect of this disclosure, there is provided a novel driving device that is light-weight and achieves resource-saving. The driving device includes a drive source, a planetary gear decelerator, a drive-target shaft, a rotation speed detector, and a sensor mount. The planetary gear decelerator includes a planetary gear mechanism equipped with an output shaft, a sun gear, an outer gear, a plurality of planetary gears, and a rotatable first carrier. The sun gear receives torque from the drive source and rotates. The outer gear is made of resin and includes an elastically deformable portion at a drive target side, and the deformable

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Figure 1:
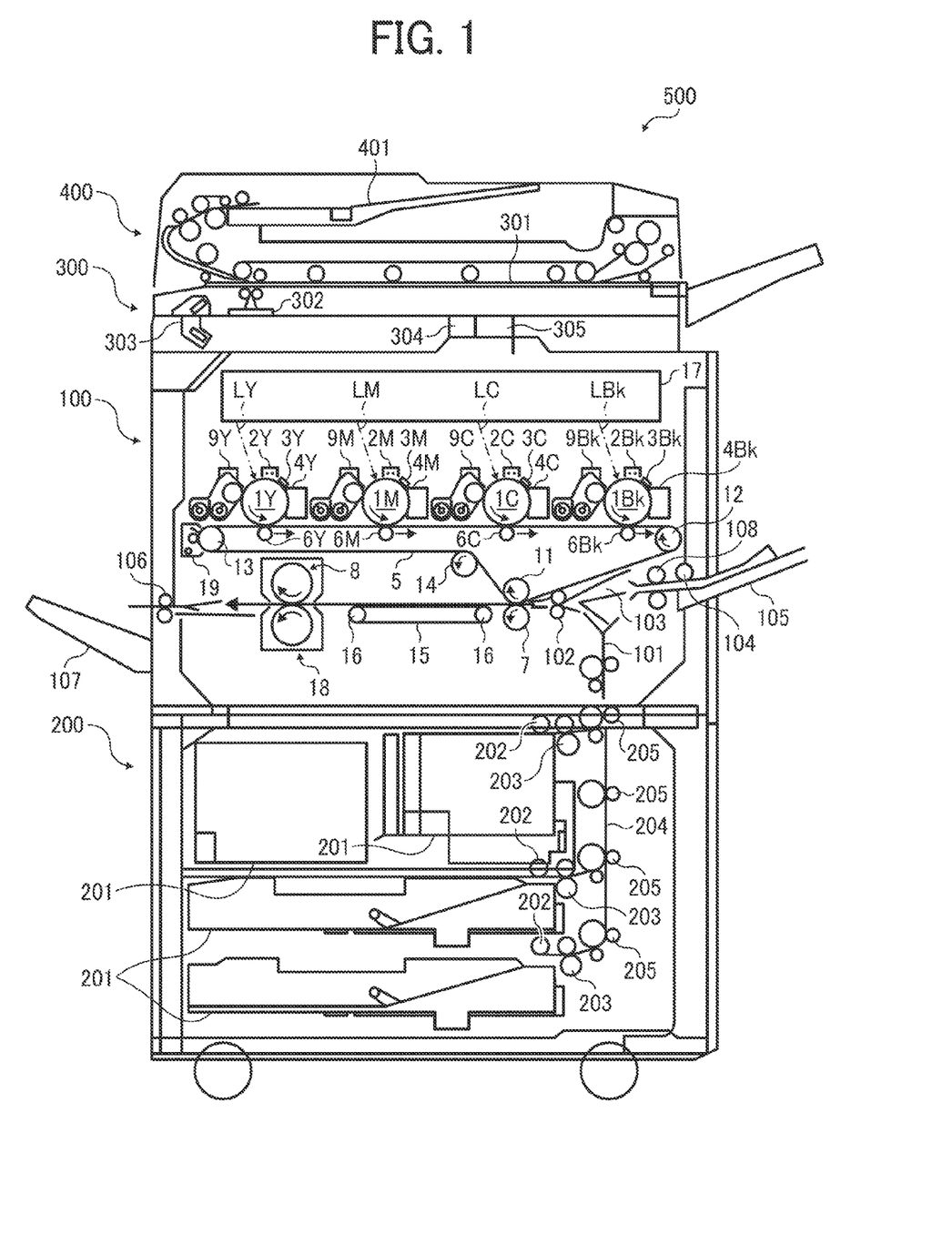
FIG. 1 is a schematic diagram illustrating an image forming apparatus, according to an illustrative embodiment of the present disclosure.

Referring now to the drawings, wherein like reference numerals designate identical or corresponding parts throughout the several views, and initially with reference to FIG. 1, a description is provided of an electrophotographic color multi-functional system as an example of an image forming apparatus according to an illustrative embodiment of the present disclosure.

FIG. 1 is a schematic diagram illustrating an image forming apparatus 500 according to an illustrative embodiment of the present disclosure. The image forming apparatus 500 is an electrophotographic color multi-functional system. It is to be noted that the image forming apparatus 500 according to the illustrative embodiment is a tandem-type image forming apparatus using a two-component, dry developing agent.

The image forming apparatus 500 includes a sheet feeding unit 200, an image forming unit 100 disposed on the sheet feeding unit 200, a scanner 300 disposed above the image forming unit 100, and an automatic document feeder (ADF) 400 disposed above the scanner 300. The image forming unit 500 receives image data containing image information from the scanner 300 or an external device such as a personal computer (PC) and performs image forming operation. As illustrated in FIG. 1, the image forming unit 100 includes four cylindrical photosensitive members (hereinafter referred to as photosensitive drums) 1Y, 1M, 1C, and 1BK, each serving as a latent image bearing member, arranged in tandem along an intermediate transfer belt 5 and driven by a driving device. The photosensitive drums 1Y, 1M, 1C, and 1Bk may be collectively referred to as photosensitive drums 1.

It is to be noted that the suffixes Y, M, C, and Bk denote colors yellow, magenta, cyan, and black, respectively. To simplify the description, these suffixes Y, M, C, and Bk indicating colors are omitted herein, unless otherwise specified.

The intermediate transfer belt 5 is formed into an endless loop and entrained around a plurality of rollers including a drive roller. The photosensitive drums 1Y, 1M, 1C, and 1Bk are arranged in tandem in the direction of movement of the intermediate transfer belt 5 and contact the intermediate transfer belt 5.

The photosensitive drums 1Y, 1M, 1C, and 1Bk are surrounded by various pieces of imaging equipment. For example, charging devices 2Y, 2M, 2C, and 2Bk, developing devices 9Y, 9M, 9C, and 9Bk, cleaning devices 4Y, 4M, 4C, and 4Bk, and charge erasing lamps 3Y, 3M, 3C, and 3Bk are respectively provided around the photosensitive drums 1Y, 1M, 1C, and 1Bk in the order of electrophotographic process. An optical writing unit 17 is disposed substantially above the photosensitive drums 1. Primary transfer rollers 6Y, 6M, 6C, and 6Bk serving as primary transfer devices are disposed opposite the respective photosensitive drums 1Y, 1M, 1C, and 1Bk via the intermediate transfer belt 5.

The intermediate transfer belt 5 is entrained around a secondary transfer opposing roller 11, a drive roller 12, a support roller 13, and a tension roller 14. The drive roller 12 is driven to rotate by a drive unit, thereby rotating the intermediate transfer belt 5. A belt cleaning device 19 is disposed opposite the support roller 13 via the intermediate transfer belt 5. The belt cleaning device 19 removes residual toner remaining on the intermediate transfer belt 5 after secondary transfer process. The secondary transfer opposing roller 11 is disposed opposite a secondary transfer roller 7 serving as a secondary transfer device via the intermediate transfer belt 5, thereby forming a secondary transfer nip between the intermediate transfer belt 5 and the secondary transfer roller 7.

Downstream from the secondary transfer nip in the direction of conveyance of a recording medium, there is provided a sheet conveyor belt 15 held taut by a pair of support rollers 16. The sheet conveyor belt 15 delivers a recording medium bearing an unfixed toner image on the surface thereof to a fixing device 18. The fixing device 18 includes a pair of fixing rollers 8 facing each other via the sheet conveyor belt 15, thereby defining a fixing nip therebetween. Heat and pressure are applied to the recording medium delivered to the fixing nip, and the unfixed toner image is fused and fixed on the recording medium.

Next, a description is provided of copying operation of the image forming apparatus 500. According to the present illustrative embodiment, when forming a full-color image, a document is placed on a document table 401 of the ADF 400. Alternatively, the ADF 400 is lifted open and the document can be placed on an exposure glass 301 of the scanner 300. After placing the document on the exposure glass 301, the ADF 400 is closed to hold the document. In a case in which the document is placed on the document table 401 of the ADF 400, when a start button is pressed by users, the document is sent onto the exposure glass 301. Subsequently, the scanner 300 is activated, moving a first carriage 302 and a second carriage 303 along the document surface. A light source of the first carriage 302 projects light against the document, which is then reflected by the document on the exposure glass 301. Subsequently, the reflected light is reflected by a mirror of the second carriage 303 towards a focusing lens 304 which directs the light to a read sensor 305. The read sensor 305 reads image information of the document.

When the start button is pressed, a motor is driven, enabling the drive roller 12 to rotate and hence rotating the intermediate transfer belt 5. In the meantime, the photosensitive drum 1Y is rotated in the direction indicated by arrow by a photosensitive-drum driving device 10 (shown in FIG. 2) and charged uniformly by the charging device 2Y while rotating. Subsequently, the photosensitive drum 1Y is illuminated with a light beam LY projected from the optical writing unit 17, thereby forming an electrostatic latent image of yellow on the surface of the photosensitive drum 1Y.

The electrostatic latent image of yellow on the photosensitive drum 1Y is developed with yellow toner by the developing device 9Y, thereby forming a visible image, also known as a toner image. Upon development, a predetermined developing bias is supplied between a developing roller of the developing device 9Y and the photosensitive drum 1Y so that the yellow toner on the developing roller is attracted electrostatically to the electrostatic latent image on the photosensitive drum 1Y.

Subsequently, the toner image of yellow formed on the surface of the photosensitive drum 1Y comes to a primary transfer position at which the photosensitive drum 1Y contacts the intermediate transfer belt 5 as the photosensitive drum 1Y rotates. At the primary transfer position, the predetermined bias voltage is supplied to the rear surface of the intermediate transfer belt 5 by the primary transfer roller 6Y disposed inside the looped intermediate transfer belt 5, across from the photosensitive drum 1Y. Application of the bias voltage to the rear surface of the primary transfer belt 5 generates a primary transfer electric field which causes the yellow toner image on the photosensitive drum 1Y to move to the intermediate transfer belt 5. Accordingly, the yellow toner image is transferred primarily onto the intermediate transfer belt 5. This process is known as primary transfer.

Similar to the toner image of yellow, toner images of magenta, cyan, and black are formed on the photosensitive drums 1M, 1C, and 1Bk, respectively, and transferred onto the intermediate transfer belt 5 such that they are superimposed one atop the other on top of the yellow toner image. Accordingly, a composite toner image is formed on the intermediate transfer belt 5. It is to be noted that after secondary transfer, the residual toner remaining on the intermediate transfer belt 5 is removed by the belt cleaning device 19.

The sheet feeding unit 200 includes a plurality of sheet cassettes 201, sheet feed rollers 202, separation rollers 203, conveyor rollers 205, and a sheet passage 204. When the start button is pressed, one of the sheet feed rollers 202 starts to rotate in accordance with the type of the recording medium selected by the user, thereby feeding the recording medium from the respective sheet cassette 201. The recording medium picked up by the sheet feed roller 202 is separated from the rest of the sheets by the separation roller 203 and fed to the sheet passage 204 one by one. Subsequently, the recording medium is delivered to a sheet passage 101 in the image forming unit 100 by conveyor rollers 205. The recording medium contacts a pair of registration rollers 102 and stops temporarily.

In a case in which a recording medium which is not stored in the sheet cassette 201 is used, the recording medium is placed manually on a side tray 105 and a sheet feed roller 104 sends the recording medium on the side tray 105 to a separation roller 108 which feeds the recording medium to a sheet passage 103 one by one. Similar to sending the recording medium from the sheet cassette 201, the recording medium sent from the side tray 105 contacts the pair of registration rollers 102.

As the intermediate transfer belt 5 rotates, the composite toner image formed on the intermediate transfer belt 5 is delivered to the secondary transfer nip (i.e., secondary transfer position) at which the intermediate transfer belt 5 contacts the secondary transfer roller 7. As described above, the pair of registration rollers 102 temporarily stops the recording medium. The pair of registration rollers 102 starts to rotate again and sends the recording medium to the secondary transfer nip in appropriate timing such that the recording medium is aligned with the composite toner image formed on the intermediate transfer belt 5.

At the secondary transfer nip, the secondary transfer roller 7 supplies a predetermined bias voltage to the back of the recording medium, thereby generating a secondary transfer electric field. Due to the secondary electric field and the pressure applied to the recording medium, the toner image on the intermediate transfer belt 5 is transferred onto the recording medium. Subsequently, the recording medium, on which the composite toner image is secondarily transferred, is delivered to the fixing device 18 by the sheet conveyor belt 15.

In the fixing device 18, the toner image is fused and fixed onto the recording medium by heat and pressure applied thereto by the pair of fixing rollers 8 as the recording medium passes between the fixing rollers 8. After the fixing process, the recording medium is output, by a pair of sheet output rollers 106, onto an output tray 107 disposed at the exterior side of the image forming apparatus.

With reference to FIGS. 2 through 7, a description is provided of a driving device for rotating a target, that is, the photosensitive drums 1Y, 1M, 1C, and 1Bk. It is to be noted that the photosensitive drums 1Y, 1M, 1C, and 1K subjected to rotation are rotated by the photosensitive-drum driving devices 10 having the same configuration as all the others. Thus, the suffixes indicating colors such as Y, M, C, and BK are omitted. The driving device according to the illustrative embodiment can be applied to various driving devices such as a driving device for driving the drive roller 12, a driving device for driving secondary transfer devices, and a driving device for driving the fixing rollers 8.

Embodiment 1

Figure 2:
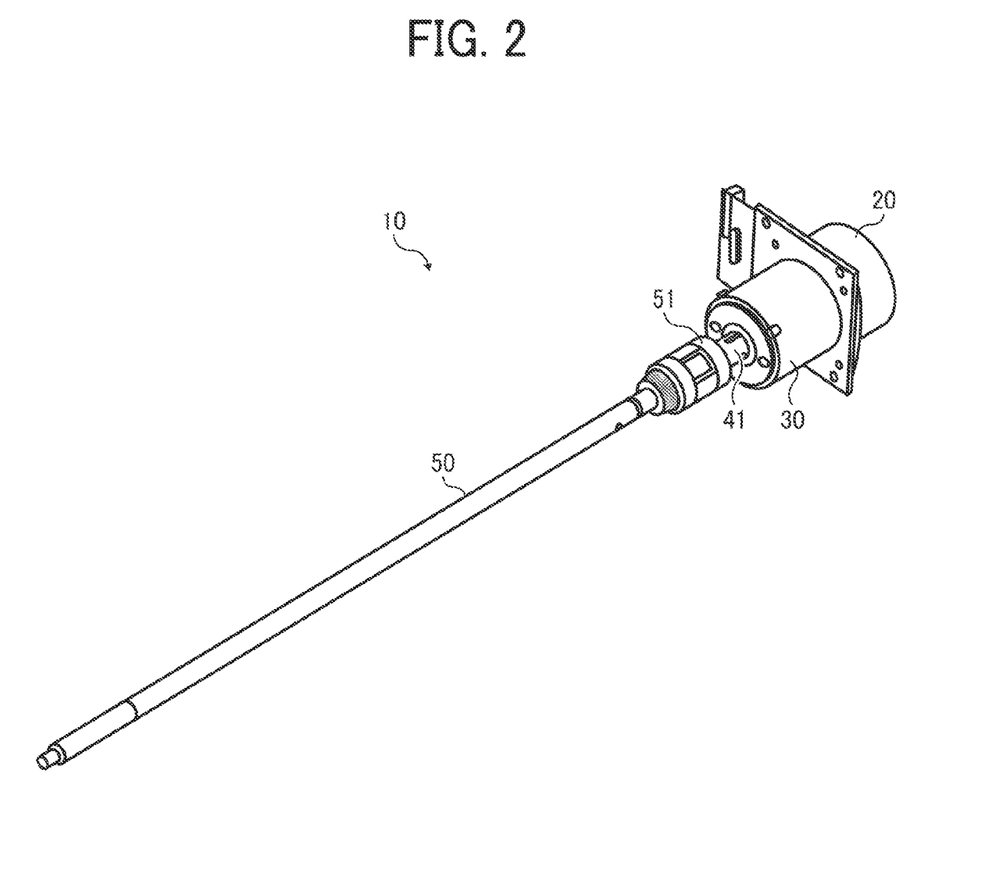
FIG. 2 is a perspective view schematically illustrating a photosensitive-drum driving device, according to Embodiment 1 of the present disclosure.
Figure 3:
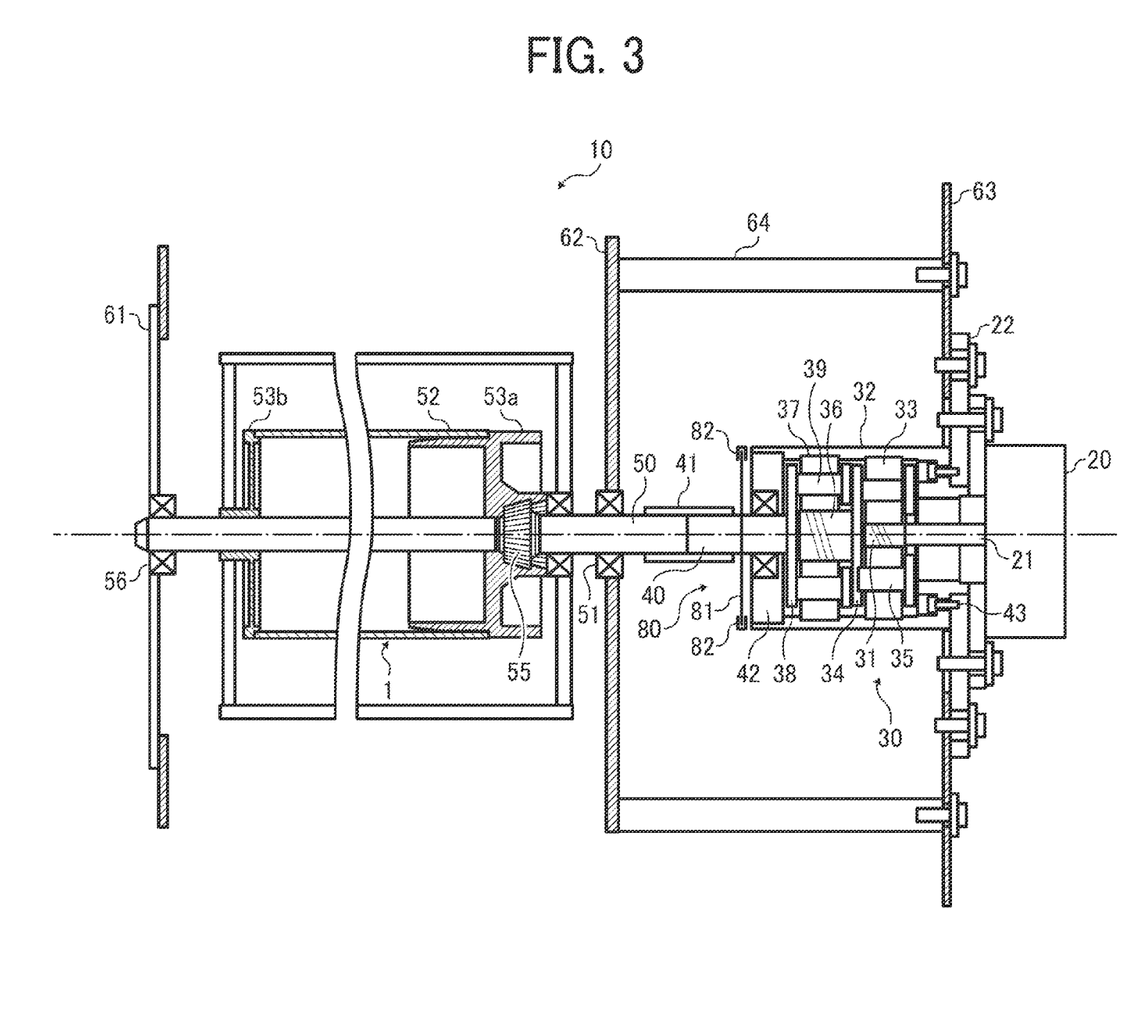
FIG. 3 is a cross-sectional view schematically illustrating the photosensitive-drum driving device of FIG. 2.
Figure 4:
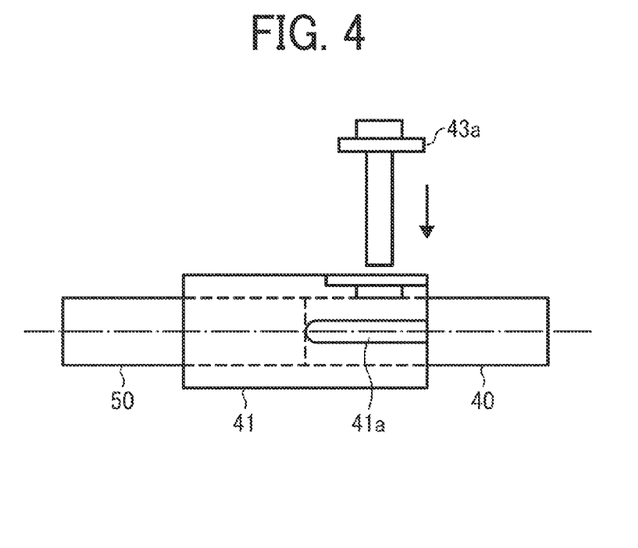
FIG. 4 is a schematic diagram illustrating a connector, according to an illustrative embodiment of the present disclosure.
Figure 5:
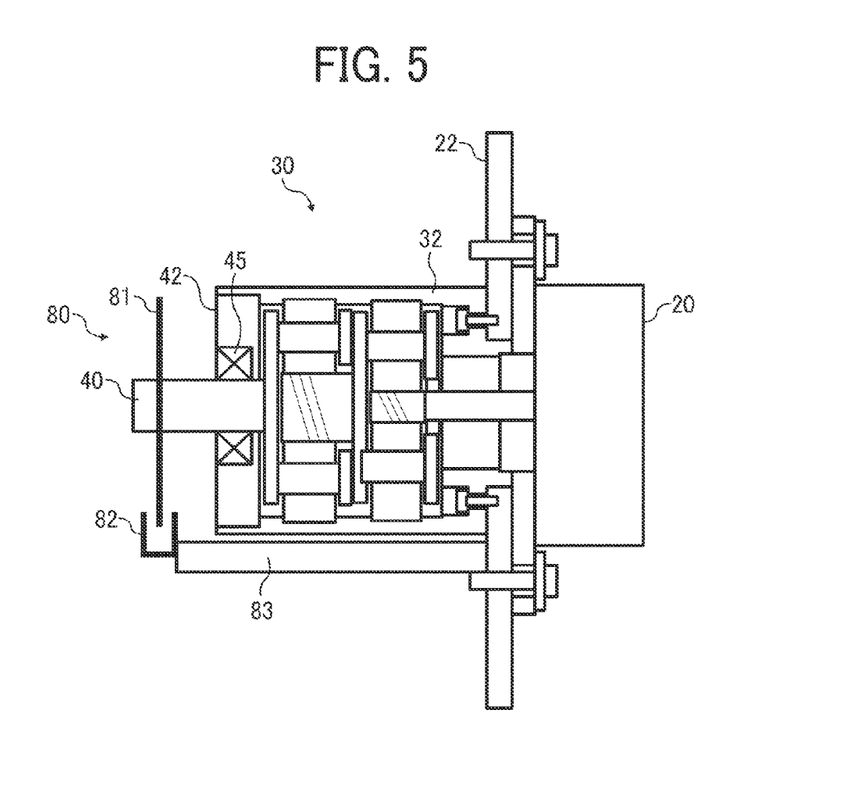
FIG. 5 is a schematic diagram illustrating a comparative example of a configuration for supporting a sensor.
Figure 6:
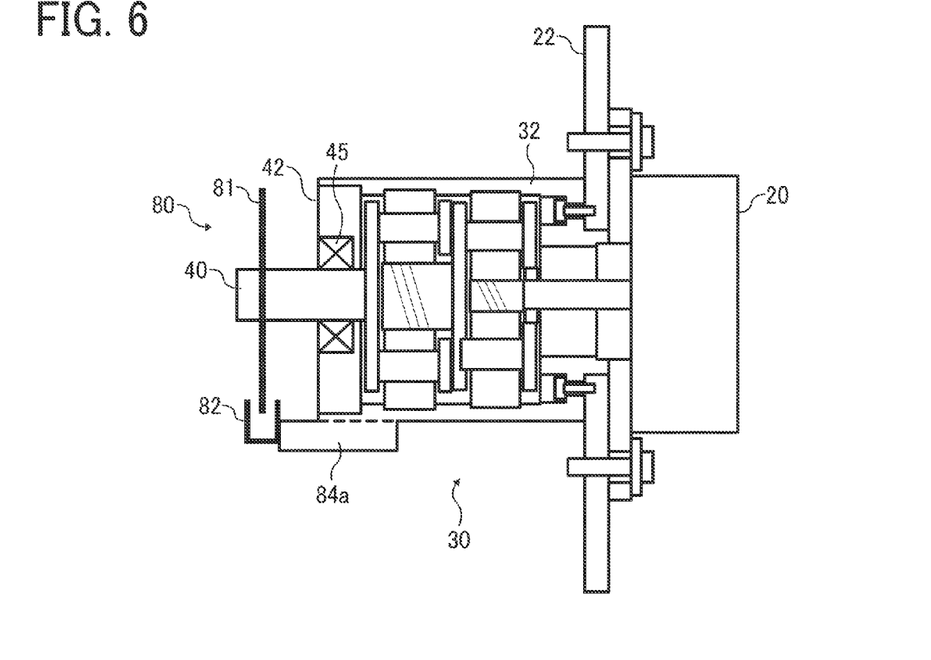
FIG. 6 is a schematic diagram illustrating a sensor mount formed on an outer gear, according to Embodiment 1.
Figure 7:
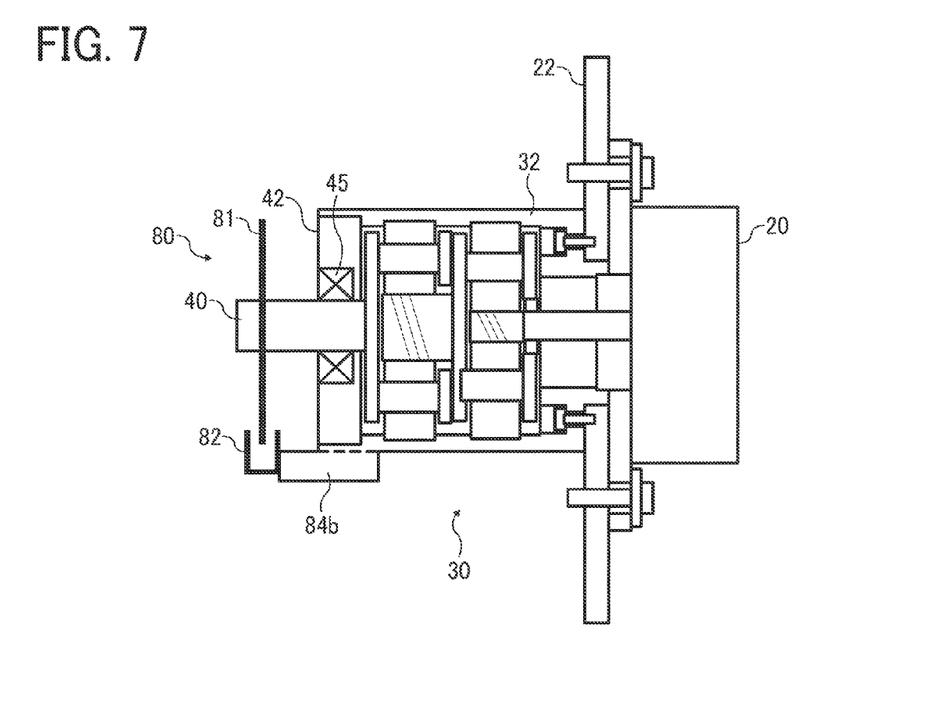
FIG. 7 is a schematic diagram illustrating another example of the sensor mount formed on the outer gear.

FIG. 2 is a perspective view schematically illustrating the photosensitive-drum driving device 10. FIG. 3 is a cross-sectional view of the driving device 10. FIG. 4 is a schematic diagram illustrating a connector 41. FIG. 5 is a schematic diagram illustrating a comparative example of a planetary gear decelerator. FIG. 6 is a schematic diagram illustrating a sensor mount 84a formed on an outer gear 32. FIG. 7 is a schematic diagram illustrating another example of the sensor mount formed on the outer gear 32.

As illustrated in FIG. 2, the photosensitive-drum driving device 10 includes a motor 20 as a drive source, the planetary gear decelerator 30, the connector 41, and a drum shaft 50 to be driven. The planetary gear decelerator 30 includes an output shaft 40 (shown in FIG. 3). The output shaft 40 is connected to the drum shaft 50 by the connector 41. A shaft bearing 51 is press fit on the drum shaft 50. Via the shaft bearing 51, the drum shaft 50 is supported and positioned in place by a main-body rear lateral plate 62 fixed to the body of the image forming unit 100. The drum shaft 50 near the leading end thereof is supported and positioned in place by a shaft bearing 56 disposed on a front lateral plate 61 fixed to the body of the image forming unit 100. In other words, the drum shaft 50 is supported and positioned in place, via the shaft bearings 51 and 56, by the rear lateral plate 62 and the front lateral plate 61 which are part of the body of the image forming unit 100. The photosensitive drum 1 is positioned in place via the drum shaft 50 relative to the body of the image forming unit 100.

With reference to FIG. 3, a description is provided of the configuration of the planetary gear decelerator 30. According to the present illustrative embodiment, the planetary gear decelerator 30 employs a two-stage 2K-H type planetary gear mechanism. In this example, the planetary gear mechanism includes two stages. Alternatively, depending on the deceleration ratio, the planetary gear mechanism may include three or more stages.

First, a description is provided of the 2K-H type planetary gear mechanism. Generally, a set of four kinds of parts, a sun gear, a planetary gear, a planetary carrier for supporting revolution of the planetary gears, and an outer gear, constitutes the 2K-H type planetary gear mechanism. One of three elements of rotation, that is, one of rotation of the sun gear, revolution of the planetary gear (rotation of the carrier), and rotation of the outer gear is fixed, and remaining two gears are each connected to the input and the output. With this configuration, the deceleration ratio can be switched between different deceleration ratios, and the direction of rotation can be changed, according to which gear is fixed and which gear is connected to the input or the output.

The two-stage 2K-H type planetary gear mechanism is classified as a composite planetary gear mechanism including at least two sets of 2K-H type planetary gear mechanisms. In the composite planetary gear mechanism, of the three shafts, two shafts are connected to each other and the remaining shaft is fixed. The other shaft serves as a drive shaft or a driven shaft.

The deceleration ratio is expressed by the following equation:

$$\text{Deceleration Ratio} = Za1/(Za1+Zc1) \times Za2/(Za2+Zc2)$$

In this equation, "1" represents the first stage and "2" represents the second stage.

Teeth of a first sun gear 31 are directly formed on an output shaft (drive shaft) 21 of the motor 20 in the first stage of the planetary gear mechanism employed in the planetary gear decelerator 30. First planetary gears 33 of the first stage meshing with the outer gear 32 fixed to the first sun gear 31 and the bracket 22 are supported by a first carrier 34 of the first stage and revolves around the periphery of the first sun gear 31.

According to the present illustrative embodiment, at least three first planetary gears 33 are concentrically disposed on the first carrier 34 for rotation balance and load dispersal. The number of planetary gears is not limited to three. More than three planetary gears may be used. According to the present illustrative embodiment, the first planetary gears 33 are evenly disposed at each of three positions on the first carrier 34. Each of the first planetary gears 33 is rotatably supported by a first carrier pin 35 disposed on the first carrier 34.

The plurality of first planetary gears 33 meshes with the first sun gear 31 and the outer gear 32 so that each of the first planetary gears 33 rotates while revolving around the first sun gear 31. The first carrier 34 supporting the first planetary gears 33 rotates slower than the first sun gear 31, thereby obtaining the desired deceleration ratio at the first stage.

It is to be noted that the first carrier 34 does not include a rotation supporting portion, thereby allowing the first carrier 34 to freely float (rotate). A second sun gear 36 serves as the input for the second stage of the planetary gear mechanism. The second sun gear 36 is provided at the center of rotation of the first carrier 34.

In the second stage of the planetary gear mechanism, a plurality of second planetary gears 37 of the second stage meshes with the outer gear 32 and the second sun gear 36, and is supported by a second carrier 38 of the second stage. The outer gear of the first stage and the outer gear of the second stage are constituted as a single integrated unit as the outer gear 32. The plurality of second planetary gears 37 revolves around the periphery of the second sun gear 36. Each of the second planetary gears 37 is supported by a second carrier pin 39 disposed on a second carrier 38 such that each of the second planetary gears 37 can rotate itself and revolve around the periphery of the second sun gear 36.

The second carrier 38 of the second stage which is the last stage includes the output shaft 40 at the center of rotation thereof. The output shaft 40 is connected to the drum shaft 50 via the connector 41 which is a hollow cylinder. The output shaft 40 of the second carrier 38 is positioned in place by the outer gear 32 and supported by a shaft bearing 45 press fit in an outer gear cap 42. The outer gear cap 42 is disposed at the end of the outer gear 32 at the photosensitive drum side such that the outer gear cap 42 covers the carriers and planetary gears. The outer gear 32 includes a step portion on the inner circumferential surface thereof. The outer gear cap 42 is fitted to the step portion of the outer gear 32. Accordingly, the misalignment of the output shaft 40 and the center of axis of the outer gear 32 can be minimized.

The connector 41 connects the drum shaft 50 and the output haft 40 to be aligned concentrically, thereby making the drum shaft 50 and the output shaft 40 as an integrated unit. The connector 41 may have a configuration such as shown in FIG. 4. As illustrated in FIG. 4, the hollow-cylinder shaped connector 41 includes a notch 41a in the center thereof. The output shaft 40 is connected and fixed to the drum shaft 50 by a frictional force between a portion of the connector 41 pressed and bent by a screw 43a. Accordingly, the connector 41 minimizes the misalignment of the drum shaft 50 and the output shaft 40, thereby achieving desired power transmission.

As illustrated in FIG. 3, the motor 20 is supported by the bracket 22. The outer gear 32 is fixed to the bracket 22 by a screw 43. The outer gear 32 and the motor 20 are held by and fixed to the bracket 22. The bracket 22 is fixed to the lateral plate 63 by a screw. The lateral plate 63 is supported and positioned in place by a stud 64 fitted to the rear lateral plate 62.

The center of shaft of the outer gear 32 at the motor 20 side includes a hollow-cylinder shaped boss. The inner circumference of the boss of the outer gear 32 and the shaft bearing provided to the motor 20 are fitted together. The outer circumference of the boss is fitted into a hole of the bracket 22.

With this configuration, the motor output shaft 21, the bracket 22, and the output shaft 40 of the planetary gear decelerator 30 are coaxially provided on the same axis, and the misalignment of these parts due to dimensional variations can be minimized, if not prevented entirely.

The photosensitive drum 1 includes a cylindrical drum base 52, and flanges 53a and 53b. The cylindrical drum base 52 is positioned in place relative to the drum shaft 50 via the flanges 53a and 53b. The flanges 53a and 53b include a hole at a position corresponding to the center of the shaft of the drum base 52. The drum shaft 50 is fitted into the hole. A connector 55 that transmits power to the drum base 52 is press fit to the drum shaft 50. Accordingly, the drum base 52 is driven via the drum flange 53a. With the configuration described above, the motor output shaft 21 (the first sun gear 31), the outer gear 32, the first carrier 34 (the second sun gear 36), the second carrier 38, the output shaft 40 of the planetary gear decelerator 30, the drum shaft 50, and the center of the shaft of the drum base 52 are all coaxially disposed on the same shaft.

The description is provided of material used for the parts employed in the planetary gear decelerator 30 according to the present illustrative embodiment. The motor output shaft 21 of the motor 20, that is, the first sun gear 31 formed directly on the input shaft of the planetary gear decelerator 30, the first carrier pin 35, the second carrier pin 39, and the second carrier 38 are made of metal including, but not limited to, stainless steel and carbon steel.

The first planetary gears 33, the first carrier 34, the second sun gear 36 integrally provided with the first carrier 34, the second planetary gears 37, and the outer gear 32 formed integrally with the housing casing and meshing with the first planetary gears 33 and the second planetary gears 37 are molded products made of resin. An example of resin includes, but is not limited to, polyacetal.

The planetary gear decelerator 30 includes a speed detector 80 that detects a rotation speed. The speed detector 80 includes a circular plate 81 as a detection target and two sensors 82 for an encoder. The circular plate 81 is disposed on the output shaft 40 of the planetary gear decelerator 30 which is disposed coaxially on the center of axis of the outer gear 32, the motor output shaft 21, and the bracket 22. In other words, the circular plate 81 for the encoder is disposed upstream from the connector 41 of the output shaft 40 in the direction of power transmission.

FIG. 3 illustrates an example of the speed detector 80. In this example, the speed detector 80 is equipped with the circular plate 81 and two sensors 82 for the encoder. However, the number of the sensors 82 is not limited thereto and can be changed in accordance with a required control accuracy.

With a plurality of the sensors 82, an amount of correction (correction value) for the detection error of the rotation speed detector such as the speed detector 80 derived from installation error and alignment error of the sensors 82 can be calculated based on a difference in detection results provided by the plurality of sensors 82. Accordingly, the motor 20 is subjected to feedback control using the correction value to achieve highly accurate rotation.

As described above, with the planetary gear decelerator 30 employed in the photosensitive-drum driving device 10, fluctuation in the rotation speed of the photosensitive drum 1 is prevented without a large-diameter gear and a direct drive motor as a drive source. The motor output shaft 21 of the motor 20, the first sun gear 31, the outer gear 32, the first carrier 34, the second sun gear 36 integrally constituted with the first carrier 34, the second carrier 38, the output shaft 40 of the planetary gear decelerator 30 disposed on the second carrier 38, the drum shaft 50, the photosensitive drum 1, and the circular plate 81 of the speed detector 80 are all coaxially disposed on the same shaft. With this configuration, the misalignment of shafts due to dimensional variations of these parts is minimized. Furthermore, since the first carrier 34 is supported floatingly relative to the outer gear 32, concentricity error between the first carrier 34 and the outer gear 32 is prevented by the aligning action due to the floating support, hence preventing fluctuation of the rotation speed of the photosensitive drum 1.

Furthermore, with the speed detector 80, the detection result obtained by the speed detector 80 is fed to the motor 20, thereby preventing more reliably fluctuation of the rotation speed of the photosensitive drum 1 caused by the concentricity error due to installation error. With this configuration, fluctuation of the rotation speed of the photosensitive drum 1 is prevented, resulting in highly accurate rotation of the photosensitive drum 1. In other words, the photosensitive-drum driving device 10 enables the photosensitive drum 1 to rotate accurately.

As described above, with the planetary gear decelerator 30, a direct drive motor as a drive source is not needed, thereby making the photosensitive-drum driving device 10 lightweight. Furthermore, the outer gear 32, the first planetary gears 33, the second planetary gears 37, the first carrier 34, the second sun gear 36 formed integrally with the first carrier 34 in the planetary gear decelerator 30 are made of resin, thereby making the photosensitive-drum driving device 10 as a whole lightweight and contributing to resource saving for the image forming apparatus 500 as compared with using metal.

Furthermore, the outer gear 32, the first planetary gears 33, the second planetary gears 37, the first carrier 34, the second sun gear 36 formed integrally with the first carrier 34 in the planetary gear decelerator 30 are made of resin while the second carrier 38 is made of metal, thereby allowing the output shaft 40 made of metal to be disposed on the second carrier 38. Because the output shaft 40 and the second carrier 38 on which the output shaft 40 is disposed are made of metal, the output shaft 40 and the second carrier 38 can withstand high stress applied by the photosensitive drum 1, as compared with using parts made of resin in the planetary gear decelerator. With this configuration, both lightweight and resource-saving are achieved while making the photosensitive-drum driving device 10 stress-resistant against high stress applied by the photosensitive drum 1, as compared with constituting all of the constituent parts of the planetary gear decelerator with resin.

According to the present illustrative embodiment, the drum shaft 50 in the radial direction is rotatably fixed to the rear lateral plate 62 via the shaft bearing 51. The outer gear 32 of the planetary gear decelerator 30 is also fixed to the rear lateral plate 62 via the bracket 22 and the stud 64. In this configuration, misalignment of the drum shaft 50 and the output shaft 40 of the planetary gear decelerator 30 upon installation of the photosensitive-drum driving device 10 in the image forming apparatus may cause fluctuation of the rotation of the photosensitive drum 1.

In view of the above, according to the present illustrative embodiment, the outer gear 32, the first planetary gears 33, the second planetary gears 37, and the second sun gear 36 integrally formed with the first carrier 34 are made of resin, thereby allowing these parts to deform elastically in the radial direction. With this configuration, even when the drum shaft 50 and the output shaft 40 of the planetary gear decelerator 30 are misaligned, such elastic deformation enables the parts to align, thereby rotating the photosensitive drum 1 accurately. Furthermore, the degree of elastic deformation of each elastically-deformable part upon alignment can be dispersed, thereby enhancing durability of the photosensitive-drum driving device 10.

Employing the output shaft 40 made of metal allows the use of the connector 41 that connects the drum shaft 50 and the output shaft 40 to achieve desired power transmission while minimizing the misalignment of the drum shaft 50 and the output shaft 40. The drum shaft 50 and the output shaft 40 are connected using the connector 41 so as to make the drum shaft 50 and the output shaft 40 as a single integrated member. In this configuration, it is not necessary to use a connector such as a spline joint with backlash to connect the shaft of the target to be driven and the output portion of the planetary gear decelerator such as in the configuration in which the constituent parts are all made of resin. Accordingly, fluctuation of rotation due to the connector with backlash is prevented.

According to the present illustrative embodiment, the speed detector 80 is disposed downstream from the connector 41 in the direction of power transmission. However, the position of the speed detector 80 is not limited thereto. Alternatively, the speed detector 80 may be disposed upstream from the connector 41 of the output shaft 40, that is, at the planetary gear decelerator 30 side.

When disposing the speed detector 80 at the planetary gear decelerator side, the speed detector 80 can be mounted in the photosensitive-drum driving device 10 without hindering assembly of the photosensitive-drum driving device 10.

Next, a description is provided of an example of installation of the speed detector 80 in the photosensitive-drum driving device 10. The circular plate 81 of the speed detector 80 is attached to the output shaft 40 of the planetary gear decelerator 30 fixed to the bracket 22 to which the motor 20 is also fixed. The sensors 82 of the speed detector 80 are attached to predetermined positions of the planetary gear decelerator 30, and the positions of the sensors 82 are adjusted and fixed.

After the drum shaft 50 is connected to the output shaft 40 of the planetary gear decelerator 30 using the connector 41, the drum shaft 50 is inserted into the hole in the rear lateral plate 62 and the planetary gear decelerator 30 is inserted into the hole in the lateral plate 63. Accordingly, the position of the drum shaft 50 and the planetary gear decelerator 30 is adjusted and fixed.

There are different ways to fix the sensors 82 to the outer gear 32. For example, the sensors 82 are fixed to the outer gear 32 constituted integrally with the housing of the planetary gear decelerator 30. Alternatively, the sensors 82 are fixed to the outer gear cap 42. Still alternatively, the sensors 82 are fixed to the lateral plate 63 to which the planetary gear decelerator 30 is fixed.

Accordingly, disposing the speed detector 80 in the photosensitive-drum driving device 10 enables the feedback control using the speed detector 80, thereby rotating the photosensitive drum 1 with precision. With this configuration, the photosensitive-drum driving device 10 can be made lightweight while rotating the photosensitive drum 1 with precision.

According to the illustrative embodiment described above, the first sun gear 31, the first carrier pin 35, the second carrier pin 39, and the second carrier 38 are made of metal, and other parts in the planetary gear decelerator 30 are made of resin. However, the configuration of the planetary gear decelerator 30 is not limited thereto.

Alternatively, the outer gear 32 may be made of resin, and the first planetary gears 33, the second planetary gears 37, the first carrier 34, and the second sun gear 36 constituted integrally with the first carrier 34 may be made of metal as needed. For example, the resin-made outer gear 32 reduces the weight of the planetary gear decelerator 30 as compared with making all the constituent parts of the planetary gear decelerator 30 with metal. In this configuration, while achieving lightweight, the durability of the photosensitive-drum driving device 10 (rotary member driving device) is enhanced to withstand high stress applied by the drive target such as the photosensitive drum 1, as compared with making all constituent parts with resin. In other words, although the amount of weight reduction is not as significant as making all the constituent parts with resin, the overall weight is lighter than the configuration in which the constituent parts are made of metal, thereby achieving resource-saving. With this configuration, both lightweight and resource-saving are achieved while making the photosensitive-drum driving device 10 stress-resistant against the high stress applied by the photosensitive drum 1, as compared with constituting all of the constituent parts of the planetary gear decelerator with resin.

Furthermore, misalignment of the drum shaft 50 and the output shaft 40 of the planetary gear decelerator 30 can be corrected by allowing the resin-made outer gear 32 to deform elastically in the radial direction. Accordingly, the photosensitive drum 1 can be rotated with precision.

According to the present illustrative embodiment, in the photosensitive-drum driving device 10, the outer gear 32 is elastically deformable in the radial direction, and the position of the drum shaft 50 in the radial direction is fixed to the rear lateral plate 62 of the image forming apparatus 500 via the shaft bearing 51. With this configuration, even when the drum shaft 50 and the output shaft 40 of the planetary gear decelerator 30 are misaligned, the influence of the misalignment towards the photosensitive drum 1 can be reduced, if not prevented entirely. The misalignment can be corrected effectively by the elastic deformation of the resin-made outer gear 32 in the radial direction, thereby rotating more reliably the photosensitive drum 1 with precision.

Furthermore, in addition to the outer gear 32, the first planetary gears 33 and the second planetary gears 37 may be made of resin, which reduces more weight than making only the outer gear 32 with resin. Accordingly, a lightweight photosensitive-drum driving device 10 can be obtained. With this configuration, the resin-made first planetary gears 33 and the resin-made second planetary gears 37 may deform elastically in the radial direction. The amount of elastic deformation of the outer gear 32 in the radial direction to correct the misalignment of the drum shaft 50 and the output shaft 40 of the planetary gear decelerator 30 can be configured less than that of when making only the outer gear 32 with resin, thereby enhancing durability of the photosensitive-drum driving device 10.

According to the present illustrative embodiment, the outer gear 32 of the planetary gear decelerator 30 can be cantilevered at the motor 20 side. With this configuration, the amount of elastic deformation of the resin-made outer gear 32 in the radial direction can be increased. More specifically, the bracket 22 fastens the motor 20 and the planetary gear decelerator 30. The motor 20 and the planetary gear decelerator 30 are fixed to the rear lateral plate 62 using the studs 64 fitted to the rear lateral plate 62 serving as a fixing member and the lateral plate 63 fixed to the studs 64. Fixing the planetary gear decelerator 30 to the rear lateral plate 62 allows the outer gear 32 to be cantilevered at the motor 20 side and can increase an amount of elastic deformation of the resin-made outer gear 32 in the radial direction. In other words, an amount of misalignment of the drum shaft 50 and the output shaft 40 that can be corrected increases, thereby rotating even more reliably the photosensitive drum 1 with precision.

According to experiments performed by the present inventors, it is known that the control effect of the feedback control for suppressing fluctuation of rotation of the photosensitive drum 1 may be degraded depending on the ways in which the speed detector 80 is mounted. Although the rotation accuracy of the photosensitive drum 1 is higher with the feedback control than without the feedback control, when fluctuation of rotation is not suppressed properly, the rotation accuracy of the photosensitive drum 1 drops as compared with suppressing fluctuation of rotation of the photosensitive drum 1 properly.

The rotation accuracy drops when the sensor 82 is disposed such that there is a gap between the detection target supported at a certain place and the circular plate 81 disposed on the output shaft 40 that moves in the radial direction in accordance with elastic deformation of the outer gear 32.

Normally, when using the speed detector 80, the motor 20 is subjected to feedback control based on the detection result provided by the speed detector 80, thereby enhancing rotation accuracy of the photosensitive drum 1. However, in the configuration in which the outer gear 32 elastically deforms, in order to maintain good rotation accuracy, a relative positional relation between the circular plate 81 and the sensors 82 is important. More specifically, it is desired that the distance between the circular plate 81 and the sensors 82 is constant.

If a gap is formed between the circular plate 81 and the sensors 82, the detection timing of the sensors 82 varies. Such a variation in the detection timing is detected as a change in the rotation speed of the photosensitive drum 1. As a result, the motor 20 is controlled based on the fault detection result, degrading control accuracy of rotation of the photosensitive drum 1.

Next, a description is provided of installation of the speed detector 80 in the photosensitive-drum driving device 10. In order to facilitate an understanding the novel features of the illustrative embodiment, with reference to FIG. 5, as a comparison, a description is provided of a comparative example in which the sensor 82 for detection of the circular plate 81 attached to the output shaft 40 is supported by the bracket 22 fixed to the lateral plate 63 via a stay 83. In the comparative example shown in FIG. 5, the outer gear 32 is formed integrally with the housing of the planetary gear decelerator 30 and fixed to the bracket 22 by a screw. The sensor 82 is attached to the stay 83 with one end thereof fixed to the bracket 22. The stay 83 is fixed to the bracket 22 using a screw or an adhesive agent.

The stay 83 is spaced apart a certain distance from the outer circumference of the outer gear 32 and extends to a position at which the stay 83 can support the sensor 82 at the position at which the sensor 82 detects the surface of the circular plate 81 attached to the output shaft 40 of the planetary gear decelerator 30. After the position of the sensor 82 is adjusted, the sensor 82 is adhered to the end surface of the stay 83 at the photosensitive drum side by an adhesive agent or fixed thereto using a screw.

The outer gear cap 42 is fitted to the outer gear 32 at the photosensitive drum side and positioned in place. The output shaft 40 is rotatably supported by the outer gear cap 42 via the shaft bearing 45 which is press fit into the outer gear cap 42. The position of the output shaft 40 relative to the outer gear 32 in the radial direction is positioned in place. In this configuration, in a case in which the outer gear 32 is made of metal, the outer gear 32 is difficult to deform elastically so that the certain distance between the sensor 82 and the circular plate 81 on the output shaft 40 which is positioned in place in the radial direction via the shaft bearing 45 is maintained.

By contrast, the outer gear 32 of the illustrative embodiment is made of resin and elastically deformable to correct alignment. Thus, the elastic deformation of the outer gear 32 changes the position of the circular plate 81, thereby generating a gap between the circular plate 81 and the sensor 82. As a result, the motor 20 is controlled by feedback control based on the fault detection result as described above, and the ability to suppress fluctuation of rotation of the photosensitive drum 1 is impaired. The rotation accuracy by the feedback control is degraded.

In view of the above, according to the illustrative embodiment, the circular plate 81 of the speed detector 80 is disposed coaxially on the same axis as the output shaft 40, and the sensor 82 is supported by a support that moves in the radial direction in conjunction with the elastic deformation of the outer gear 32. As the sensor 82 is supported by the support that moves in the radial direction in accordance with the elastic deformation of the outer gear 32, the sensor 82 can move in the same radial direction. Accordingly, the fluctuation of the relative distance between the sensor 82 and the circular plate 81 which is disposed coaxially on the axis of the output shaft 40 and moves in the same radial direction can be reduced. In other words, the sensor 82 follows the movement of the circular plate 81 in the radial direction in accordance with the elastic deformation of the outer gear 32.

With this configuration, even when the outer gear 32 elastically deforms, the distance between the circular plate 81 and the sensor 82 of the speed detector 80 is kept constant, hence preventing erroneous detection by the speed detector 80. In other words, even when the outer gear 32 elastically deforms, the gap generated between the circular plate 81 and the sensor 82 of the speed detector 80 can be reduced, hence reducing the fluctuation of rotation of the photosensitive drum 1 and preventing erroneous detection by the speed detector 80. Both lightweight and resource-saving are achieved while making the photosensitive-drum driving device 10 stress-resistant against high stress applied by the rotating member such as the photosensitive drum 1, as compared with constituting all the constituent parts of the planetary gear decelerator 30 with resin.

More specifically, according to the present illustrative embodiment as shown in FIG. 6, the circular plate 81 of the speed detector 80 is disposed coaxially on the output shaft 40, and the outer gear 32 formed integrally with the housing of the planetary gear decelerator 30 includes a sensor mount 84a. The sensor 82 is attached to the sensor mount 84a of the outer gear 32. In other words, the sensor 82 is held by outer gear 32 that elastically deforms.

This configuration reduces the overall size of the planetary gear decelerator 30, and furthermore, the sensor 82 of the speed detector can follow the elastic deformation of the resin-made outer gear 32. A gap formed between the circular plate 81 and the sensor 82 of the speed detector 80 can be reduced, thereby rotating the photosensitive drum 1 accurately.

Preferably, as illustrated in FIG. 6 and FIG. 7, the sensor mount 84a (84b in FIG. 7) is disposed near the end of the outer gear 32 at the photosensitive drum side. In this configuration, the sensor mount 84a (84b) near the circular plate 81 disposed on the output shaft 40 moves in the radial direction, thereby reducing more reliably the gap between the circular plate 81 and the sensor 82.

In the configuration illustrated in FIG. 6, the shape of the outer gear 32 formed integrally with the housing is relatively complicated, which affects the gear accuracy of the teeth of the outer gear 32 meshing with the teeth of the planetary gears, while the meshing portion of the outer gear 32 is subjected to a highly accurate molding process.

In view of the above, according to the illustrative embodiment shown in FIG. 7, the gear accuracy can be maintained with the following configuration in a case in which the shape (i.e., the thickness) of the outer gear 32 in the circumferential direction may influence the gear accuracy of the outer gear 32 meshing with the planetary gears. As illustrated in FIG. 7, the sensor mount 84b is formed on the outer gear 32 outside the meshing portion at which the outer gear 32 meshes with the planetary gears, to prevent degradation of the gear accuracy at the meshing portion. With this configuration, the gear accuracy of the outer gear 32 at the time of molding process is less affected, and hence the photosensitive drum 1 can be rotated accurately.

As described above, according to the illustrative embodiments, in the planetary gear decelerator 30 the outer gear cap 42 is fitted to the outer gear 32 at the photosensitive drum side and positioned in place. The output shaft 40 is rotatably supported by the outer gear cap 42 via the shaft bearing 45 which is press fit into the outer gear cap 42. The output shaft 40 is positioned in place relative to the outer gear 32 in the radial direction.

By positioning in place the output shaft 40 relative to the outer gear 32 in the radial direction, the gap between the circular plate 81 and the sensor 82 of the speed detector 80 can be reduced, thereby rotating the photosensitive drum 1 accurately. Furthermore, the force in the radial direction derived from the misalignment of the drum shaft 50 and the output shaft 40 is transmitted directly to the outer gear 32 via the shaft bearing 45. Accordingly, uneven contact of the outer gear 32 and the second planetary gears 27 of the second stage can be prevented, thereby enhancing durability of the photosensitive-drum driving device 10 while rotating the photosensitive drum 1 accurately.

Embodiment 2

Figure 8:
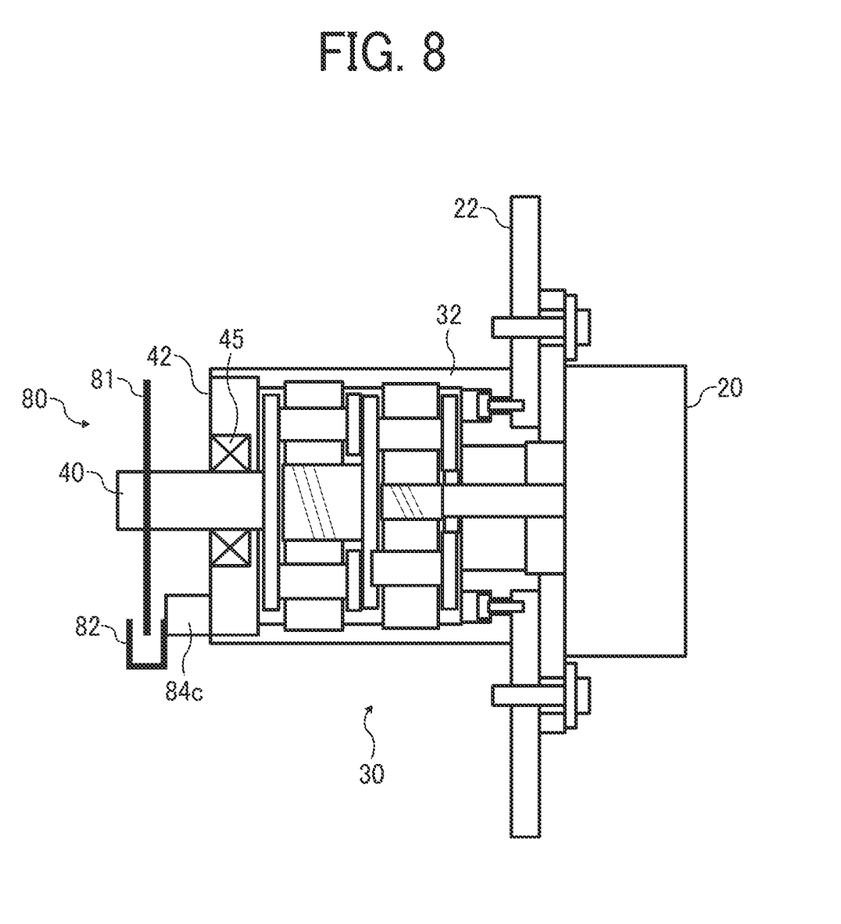
FIG. 8 is a schematic diagram illustrating a planetary gear decelerator according to another illustrative embodiment of the present disclosure.

With reference to FIG. 8, a description is provided of a planetary gear decelerator according to another illustrative embodiment of the present disclosure. FIG. 8 is a schematic diagram illustrating the planetary gear mechanism 30 of Embodiment 2.

The only difference between Embodiment 1 and Embodiment 2 is a configuration of the place at which the sensor 82 of the speed detector 80 is attached in the photosensitive-drum driving device 10. Thus, the same reference numbers used in Embodiment 1 are given to the parts having the same functions in Embodiment 2. The detailed descriptions and effects of the same parts are omitted herein.

As illustrated in FIG. 8, in the photosensitive-drum driving device 10, the circular plate 81 of the speed detector 80 is disposed coaxially on the axis of the output shaft 40, and a sensor mount 84c to which the sensor 82 is attached is disposed on the outer gear cap 42 that moves in accordance with the elastic deformation of the outer gear 32. The sensor 82 is attached to the sensor mount 84c on the outer gear cap 42. That is, the sensor 82 is supported by the outer gear cap 42.

With this configuration, the sensor 82 is enabled to follow the movement of the circular plate 81 disposed on the output shaft 40 that moves in accordance with the elastic deformation of the outer gear 32 caused by the misalignment of the drum shaft 50 and the output shaft 40.

The sensor mount 84c, to which the sensor 82 is attached, is disposed on the outer gear cap 42. In this configuration, the position of the sensor mount 84c supporting the sensor 82 in the radial direction can be disposed inside the diameter of the outer gear 32. In a case in which the detection position of the circular plate 81 in the radial direction is inside the diameter of the outer gear 32, the sensor 82 can be supported at a position closer to the detection position than from the sensor mount 84a (84b) disposed on the outer gear 32 in Embodiment 1.

According to the present illustrative embodiment, the sensor 82 can follow the movement of the circular plate 81 more reliably than Embodiment 1. The gap between the circular plate 81 and the sensor 82 of the speed detector 80 can be reduced, thereby rotating the photosensitive drum 1 accurately.

The sensor mount 84c is not molded together with the outer gear 32, thereby preventing degradation of the gear accuracy upon molding the outer gear 32 and hence achieving more reliable and highly accurate rotation. In other words, the outer gear 32 does not include the sensor mount 84c as compared with Embodiment 1. With this configuration, degradation of the gear accuracy upon molding the outer gear 32 can be prevented, hence achieving more reliable and highly accurate rotation.

Although the embodiment of the present invention has been described above, the present invention is not limited to the foregoing embodiments, but a variety of modifications can naturally be made within the scope of the present invention.

In an aspect of the disclosure, a driving device (e.g., the photosensitive-drum driving device 10) for driving a drive target (e.g., the photosensitive drum 1) includes a drive source (e.g., the motor 20); a planetary gear decelerator (e.g., the planetary gear decelerator 30) including a planetary gear mechanism, the planetary gear mechanism equipped with an output shaft (e.g., the output shaft 40); a sun gear (e.g., the second sun gear 36) rotated by the drive source; an outer gear (e.g., the outer gear 32) made of resin and including a deformable portion at a drive target side, the deformable portion being deformable in a radial direction; a plurality of planetary gears (e.g., the second planetary gears 37) to engage the sun gear and the outer gear, the plurality of planetary gears disposed along an inner circumferential surface of the outer gear at equal intervals; a rotatable first carrier (the second carrier 38 of the second stage) to rotatably support the plurality of planetary gears; a drive-target shaft (e.g., the drum shaft 50) connected to the output shaft of the planetary gear mechanism, to support the drive target; a rotation speed detector (e.g., the rotation speed detector 80) to detect a rotation speed of the planetary gear decelerator, the rotation speed detector including a sensor (e.g., the encoder sensor 82) and a detection target (the circular plate 81) disposed coaxially on the output shaft; and a sensor mount (e.g., the sensor mount 84) to support the sensor and move in the radial direction in accordance with elastic deformation of the outer gear. With this configuration, as described in Embodiment 1, the driving device such as the photosensitive-drum driving device 10 can be lightweight and achieve resource-saving, while rotating accurately the drive target such as the photosensitive drum 1.

The first carrier (e.g., the second carrier 38 of the second stage) includes the output shaft such as the output shaft 40, and the first carrier and the output shaft are made of metal. With this configuration, as described in Embodiment 1, the driving device (the photosensitive-drum driving device 10) is made stress-resistant against high stress applied by the drive target (e.g., the photosensitive drum 1) as compared with constituting all of the constituent parts of the planetary gear decelerator with resin.

The outer gear (e.g., the outer gear 32) supports the sensor (e.g., the sensor 82) of the rotation speed detector (e.g., the speed detector 80). This configuration reduces the overall size of the planetary gear decelerator 30, and furthermore, the sensor of the speed detector can follow the elastic deformation of the resin-made outer gear. Accordingly, the gap between the detection target (e.g., the circular plate 81) and the sensor (e.g., the sensor 82) of the speed detector can be reduced, thereby rotating accurately the target (e.g., the photosensitive drum 1).

The planetary gear decelerator includes an outer-gear cap (e.g., the outer-gear cap 42) disposed at an end of the outer gear (e.g., the outer gear 32) at the drive target side, to cover the carrier (e.g., the second carrier 38) and the plurality of planetary gears (e.g., the second planetary gears 37) and support the sensor (e.g., the sensor 82) of the speed detector (e.g., the speed detector 80). As described in Embodiment 2, this configuration enables the sensor of the speed detector to follow the elastic deformation of the resin-made outer gear. The gap between the detection target and the sensor can be reduced even more, thereby rotating target more accurately. Furthermore, the sensor mount (e.g., the sensor mount 84) can be eliminated from the outer gear, thereby preventing degradation of the gear accuracy upon molding the outer gear, and hence enhancing rotation accuracy.

The drive-target shaft (e.g., the drum shaft 50) is rotatably supported by a lateral plate (e.g., the rear lateral plate 62) of a housing of a device such as the image forming apparatus 500 employing the driving device (e.g., the photosensitive-drum driving device 10) while the position of the drive-target shaft in the radial direction is fixed to the lateral plate via a shaft bearing (e.g., the shaft bearing 51). With this configuration, even when the drive-target shaft and the output shaft of the planetary gear decelerator are misaligned, the influence of deviation towards the drive target such as the photosensitive drum 1 can be reduced, if not prevented entirely. The misalignment can be corrected effectively by the elastic deformation of the outer gear such as the resin-made outer gear 32 in the radial direction, thereby rotating more reliably the photosensitive drum 1 with precision.

The planetary gears (e.g., the second planetary gears 37) of the second stage are made of resin and elastically deformable in the radial direction. With this configuration, as described in Embodiment 1, because the planetary gears of the second stage are elastically deformable, even when the drive-target shaft (e.g., the drum shaft 50) and the output shaft (e.g., the output shaft 40) of the planetary gear decelerator are misaligned, the amount of elastic deformation of the outer gear in the radial direction that corrects the misalignment can be reduced. Accordingly, the durability of the driving device (e.g., the planetary gear decelerator 10) is enhanced.

The sun gear (e.g., the second sun gear 36) of the second stage and the carrier such as the first carrier 34 of the first stage are made of resin, constituted as a single integrated unit, and elastically deformable in the radial direction. With this configuration, the second sun gear of the second stage formed integrally with the carrier is elastically deformable in the radial direction. With this configuration, even when the drive-target shaft and the output shaft such as the output shaft of the planetary gear decelerator are misaligned, the amount of elastic deformation of the outer gear such as the outer gear 32 in the radial direction that corrects the misalignment can be less than the foregoing embodiment. Accordingly, the durability of the driving device such as the photosensitive-drum driving device 10 is enhanced.

The driving device such as the photosensitive-drum driving device 10 includes a plurality of planetary gear mechanisms such as a first-stage planetary gear mechanism and a second-stage planetary gear mechanism. A motor output shaft (e.g., the motor output shaft 21) of the drive source such as the motor 20, the sun gear (e.g., the first sun gear 31 and the second sun gear 36), the outer gear (e.g., the outer gear 32), the carrier (e.g., the first carrier 34 and the second carrier 38), the output shaft (e.g., the output shaft 40 of the planetary gear decelerator 30), the drive-target shaft (e.g., the drum shaft 50), and the drive target (the photosensitive drum 1) are coaxially disposed on the same axis, and at least one of carriers is floatingly supported relative to the outer gear. With this configuration, as described in Embodiment 1, the first carrier 34 of the first stage is supported floatingly relative to the outer gear 32 so that the concentricity error between the carrier (e.g., the first carrier 34) and the outer gear (e.g., the outer gear 32) is prevented by the aligning action of the floating support, hence preventing fluctuation of the rotation speed of the photosensitive drum 1.

The rotation speed detector of the planetary gear decelerator such as the planetary gear decelerator 30 includes a plurality of detecting members (e.g., the sensors 82). As described in Embodiment 1, with the plurality of the detecting members, an amount of correction for detection errors of the speed detector 80 derived from installation errors and alignment errors of the sensors 82 can be calculated based on the difference in detection results of the plurality of sensors 82.

The planetary gear decelerator such as the planetary gear decelerator 30 includes an outer-gear cap (e.g., the outer gear cap 42) disposed at an end of the outer gear at the drive target (e.g., the photosensitive drum 1) side, to cover the carrier (e.g., the second carrier 38 of the second stage) and the plurality of planetary gears of the second stage. The outer gear cap includes a support portion including a shaft bearing (e.g., the shaft bearing 45) to rotatably support the output shaft (e.g., the output shaft 40). With this configuration, the gap between the detection target and the detecting device of the speed detector can be reduced more, thereby rotating the target, e.g., the photosensitive drum 1, more accurately.

The force in the radial direction caused by the misalignment of the drive-target shaft and the output shaft can be directly transmitted to the outer gear via the shaft bearing (e.g., the shaft bearing 45). Accordingly, uneven contact of the outer gear and the planetary gears (e.g., the second planetary gears 37) of the second stage can be prevented, thereby enhancing durability of the photosensitive-drum driving device 10 while rotating more accurately the photosensitive drum 10.

In an image forming apparatus such as the image forming apparatus 500 including a plurality of drive targets such as a plurality of photosensitive drums 1 and the intermediate transfer belt 5, at least one of the plurality of drive targets is driven by the driving device such as the photosensitive-drum driving device 10 and the roller driving device. With this configuration, the image forming apparatus 500 can provide the similar effect as that of the photosensitive-drum driving device 10 and the roller driving device.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A driving device for driving a drive target, comprising:
a drive source;
a planetary gear decelerator including a planetary gear mechanism, the planetary gear mechanism including
a sun gear to receive torque from the drive source and rotate,
an outer gear made of resin and including a deformable portion at a drive target side, the deformable portion being elastically deformable in a radial direction,
a plurality of planetary gears to engage the sun gear and the outer gear, the plurality of planetary gears disposed along an inner circumferential surface of the outer gear at equal intervals,
a rotatable first carrier to rotatably support the plurality of planetary gears, and
an output shaft to output the torque, a drive-target shaft connected to the output shaft of the planetary gear mechanism, to support the drive target and to transmit the torque to the drive target;

a rotation speed detector to detect a rotation speed of the planetary gear decelerator, the rotation speed detector including a sensor and a circular plate disposed coaxially on a center axis of the output shaft, the circular plate being upstream from the drive-target shaft connected to the output shaft; and a sensor mount to support the sensor, wherein the sensor moves in a radial direction in accordance with the elastic deformation of the outer gear to provide a constant distance between an outer circumference of the circular plate and the sensor.

2. The driving device according to claim 1, wherein the first carrier includes the output shaft, and the first carrier and the output shaft are made of metal.

3. The driving device according to claim 1, wherein the outer gear supports the sensor of the rotation speed detector.

4. The driving device according to claim 1, wherein the planetary gear decelerator includes an outer-gear cap disposed at an end of the outer gear at the drive target side, to cover the first carrier and the plurality of planetary gears and support the sensor of the rotation speed detector.

5. The driving device according to claim 1, wherein the sensor is one of a plurality of sensors.

6. The driving device according to claim 1, wherein the planetary gear decelerator includes an outer-gear cap disposed at an end of the outer gear at the drive target side to cover the first carrier and the plurality of planetary gears, and the outer gear cap includes a support portion with a shaft bearing to rotatably support the output shaft.

7. The driving device according to claim 1, wherein the drive-target shaft is rotatably supported by a lateral plate of a housing of a device employing the driving device while a position of the drive-target shaft in the radial direction is fixed to the lateral plate via a shaft bearing.

8. The driving device according to claim 7, wherein the plurality of planetary gears are made of resin and elastically deformable in the radial direction.

9. The driving device according to claim 8, further comprising a second carrier, wherein the second carrier and the sun gear are made of resin, constituted as a single integrated unit, and elastically deformable in the radial direction.

10. The driving device according to claim 9, wherein a drive shaft of the drive source, the sun gear, the outer gear, the first carrier, the second carrier, the output shaft of the planetary gear decelerator, the drive-target shaft, and the drive target are coaxially arranged, and at least one of the carriers is floatingly supported relative to the outer gear.

11. An image forming apparatus, comprising:

the driving device of claim 1.

12. The driving device according to claim 1, wherein the sensor is an encoder.

13. The driving device according to claim 1, wherein the sensor is attached to the sensor mount.

14. The driving device according to claim 13, wherein the sensor mount is near ends of the circular plate in the radial direction.

* * * * *